United States Patent [19]

Ziv

[11] 4,180,283
[45] Dec. 25, 1979

[54] CHILD SAFETY SEAT RESTRAINT ADAPTER MEANS

[75] Inventor: Avraham Ziv, Sepulveda, Calif.

[73] Assignee: American Safety Equipment Corporation, San Fernando, Calif.

[21] Appl. No.: 906,880

[22] Filed: May 17, 1978

[51] Int. Cl.² .......................................... B60R 21/10
[52] U.S. Cl. .................................. 280/802; 280/808; 297/469
[58] Field of Search ....................... 280/747, 745, 744; 297/388, 389

[56] References Cited

U.S. PATENT DOCUMENTS

| 3,335,434 | 8/1967 | Gamon | 297/390 X |
|---|---|---|---|
| 3,563,600 | 2/1971 | Converse | 297/390 X |
| 3,596,986 | 8/1971 | Regedale | 297/389 X |
| 3,606,453 | 9/1971 | Cicero | 297/389 X |
| 3,709,558 | 1/1973 | Jakob | 297/389 X |
| 3,727,944 | 4/1973 | Wize | 280/745 |
| 3,767,259 | 10/1973 | Blake et al. | 297/390 X |
| 3,791,694 | 2/1974 | Roberts et al. | 297/389 X |
| 3,791,694 | 2/1974 | Roberts et al. | 297/389 X |
| 3,796,461 | 3/1974 | Cucheran et al. | 297/389 |
| 3,876,249 | 4/1975 | Erik | 280/747 X |
| 3,912,378 | 10/1975 | Tanaka | 297/389 |
| 3,938,859 | 2/1976 | Henderson et al. | 297/385 |
| 4,025,111 | 5/1977 | Tanaka | 297/390 |
| 4,040,664 | 8/1977 | Tanaka | 297/389 X |
| 4,099,770 | 7/1978 | Elsholz et al. | 297/389 X |
| 4,102,020 | 7/1978 | Lindblad | 280/747 X |

Primary Examiner—Joseph F. Peters, Jr.
Assistant Examiner—Norman L. Stack, Jr.
Attorney, Agent, or Firm—Poms, Smith, Lande & Rose

[57] ABSTRACT

A child safety seat restraint adapter for restraining a child safety seat on a vehicle seat in association with a preinstalled passive diagonal torso safety belt anchored at one end on the vehicle door, extending across the vehicle seat and being anchored at an opposite end inboard of the vehicle seat, has an auxiliary safety belt buckle and an auxiliary anchor for anchoring the buckle outboard of the vehicle seat to the vehicle floor, an auxiliary tongue plate for releasably engaging with the buckle and a connector for connecting the tongue plate in a fixed relation to the preinstalled safety belt intermediate its ends whereby the child safety seat may be restrained on the vehicle seat by passing portions of the safety belt inboard of the connector over the child seat, when positioned on the passenger seat, and engaging the tongue plate with the buckle.

5 Claims, 4 Drawing Figures

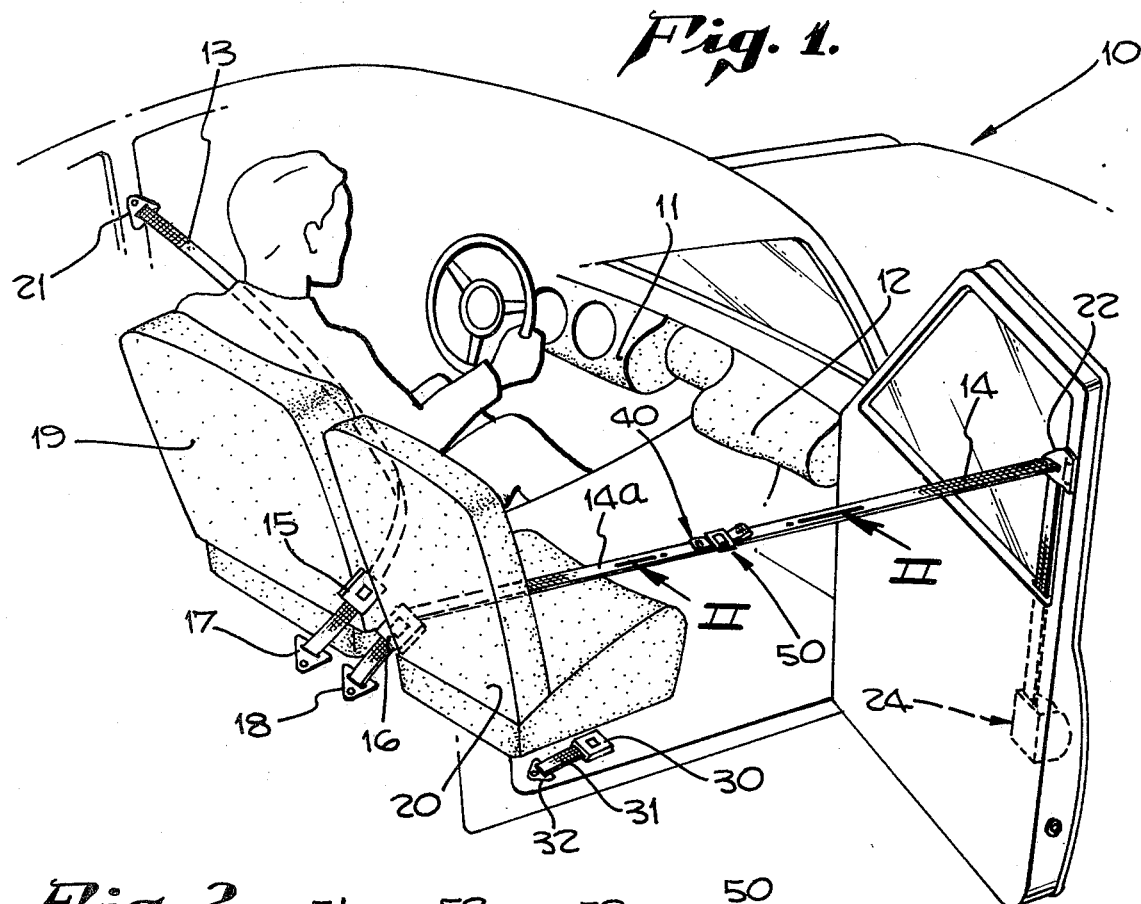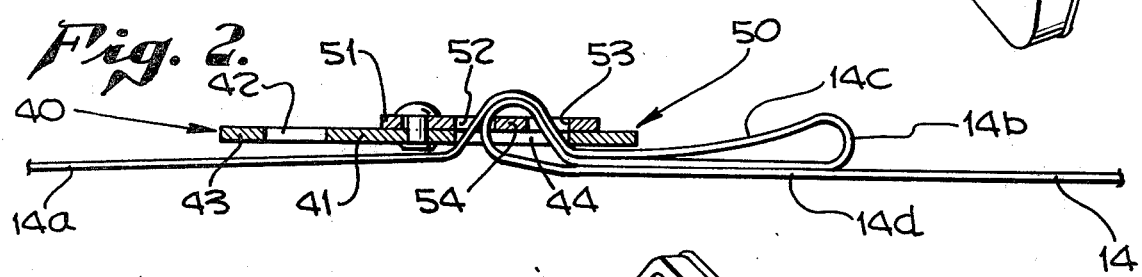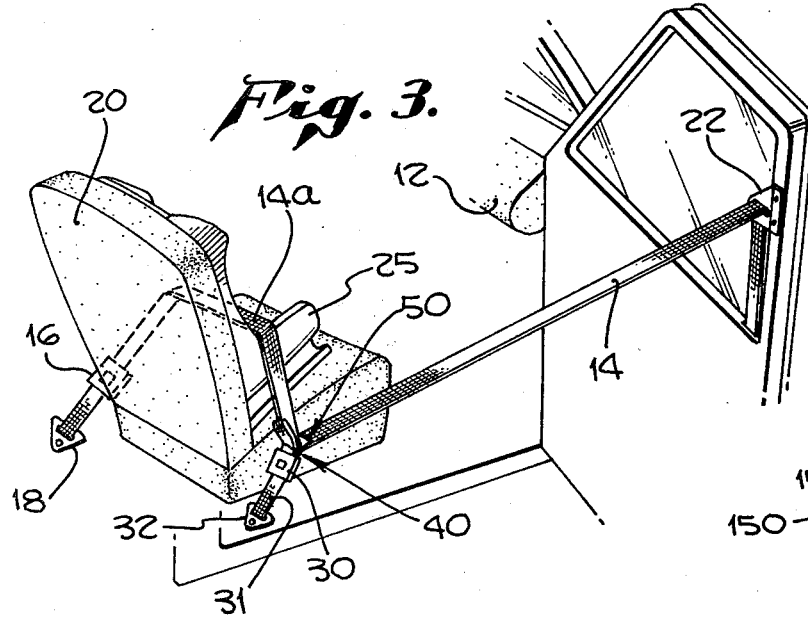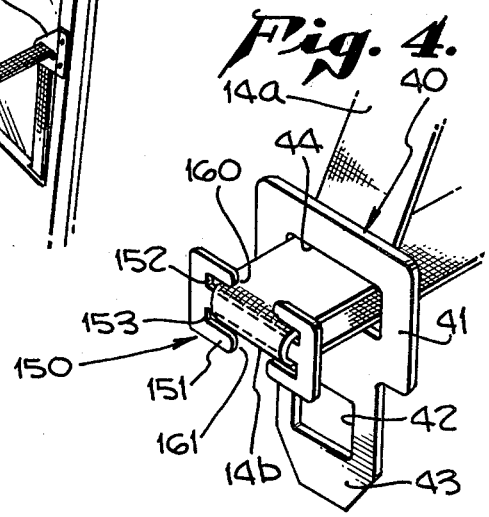

CHILD SAFETY SEAT RESTRAINT ADAPTER MEANS

BACKGROUND OF THE INVENTION

The present invention pertains in general to means for restraining a child safety seat to a vehicle seat to facilitate the carrying of small children in vehicles with the protection afforded by existing child safety harness and seat arrangements and more particularly to an adapter means for employing portions of a preinstalled passive diagonal torso safety belt to restrain the child safety seat on the vehicle seat.

Child safety seats are generally known, as shown in U.S. Pat. No. 4,040,664, and may be positioned and held on a vehicle seat by passing the normally floor anchored lap safety belt about the seat and, in effect, buckling it in place on the seat just as a passenger would buckle himself into the vehicle seat. However, with the advent of different types of so-called "three point" safety harnesses, additional problems have occurred in using the existing seat belt arrangement for buckling the child safety seat into the vehicle seat. In one known prior art situation, where the chest belt and lap belt portions of the safety harness pass freely through the tongue plate connector employed for buckling the belt portions to a floor mounted retractor, a locking clip has been appended to the belt portions to in effect fix the tongue plate relative to the lap portion so that the lap portion of the safety harness could be wound over the seat belt and buckled in place very much as in the manner shown in said U.S. Pat. No. 4,040,664, the chest belt portion being merely passed behind the child seat with the lap portion extending over it.

More recently, so called "passive" safety belt harness arrangements have been considered for use in commercial vehicles wherein the safety belt is moved between positions of passenger restraint and passenger release through merely the opening and closing of the vehicle door, there being, however, no specific lap belt portion available for restraining a child safety seat in place. One such "passive" restraint system is illustrated in the co-pending U.S. application for Patent, Ser. No. 872,306 filed Jan. 25, 1978 and being assigned to the assignee of the within application. In that passive safety belt system, the passengers lower body portions are restrained in the event of sudden vehicle deceleration through the provision of knee pads positioned on the vehicle interior. Only the passenger's upper torso is restrained by a safety belt which extends diagonally from a floor anchored inboard of the vehicle seat to a guide means mounted on the vehicle door, the safety belt passing through the guide means to a door mounted safety belt retractor which winds and unwinds the belt during door opening and closing motions. In such a seat belt arrangement, it is not possible to use the preinstalled safety belt to hold or restrain a child safety seat in the associated vehicle seat.

SUMMARY OF THE INVENTION

It is therefore the primary object of the present invention to disclose and provide a child safety seat restraint adapter means for restraining a child safety seat on a vehicle seat where the vehicle is provided with a preinstalled passive safety belt harness wherein a diagonal torso belt is provided without a lap belt portion available for buckling the child safety seat in place on the vehicle seat.

It is a still further object of the present invention to disclose and provide such a restraint adapter means which is easily assembled and disassembled from the passive seat belt in order to facilitate using such belt for restraining the child safety seat on the vehicle seat, and alternatively placing it back into normal use as a passive restraint for a passenger seated on the seat.

Generally stated, the present invention in child safety seat restraint adapter means for restraining a child safety seat on a vehicle seat in association with a preinstalled passive safety belt employing a diagonal torso belt includes the provision of an auxiliary safety belt buckle, auxiliary tongue plate means and connector means for connecting the auxiliary tongue plate means to the belt in a manner to employ portions of the diagonal torso belt to restrain the child safety seat to the vehicle seat by means of the auxiliary tongue plate means and buckle means. More specifically, and as particularly contemplated within the present invention, the auxiliary safety belt buckle is provided with means for anchoring a buckle outboard of the vehicle seat to the vehicle floor. The auxiliary tongue plate means is provided with a tongue portion to be releasably engaged in the buckle and a rearward webbing receiving aperture to cooperate with the connector means. Preferably, the connector means includes a slotted plate positioned adjacent the tongue plate with webbing portions of the passive safety belt entrained through the tongue plate aperture and connector plate slots in a manner to anchor a midportion of the passive safety belt to the floor mounted safety belt buckle when desired to restrain a child safety seat to the associated vehicle seat. As is further particularly contemplated within the present invention, the auxiliary tongue plate means and connector means are provided in a manner to facilitate installing and removing them from the safety belt the belt portions being easily entrained and released from the tongue plate means and connector means as described more fully hereinafter with regard to the description of a preferred exemplary embodiment.

BRIEF DESCRIPTION OF THE DRAWINGS

FIG. 1 is a perspective view of an exemplary embodiment of child safety seat restraint adapter means according to the present invention for restraining a child safety seat on a vehicle seat in association with an exemplary embodiment of preinstalled passive diagonal torso safety belt;

FIG. 2 is a detail view of a portion of the adapter means of FIG. 1 taken therein along the plane II—II;

FIG. 3 is a perspective view generally as in FIG. 1 showing the exemplary embodiment of child safety seat restraint adapter means in a position restraining a child safety seat on the vehicle seat; and FIG. 4 is a perspective view of an alternative construction of connector means employed in the exemplary embodiment of child safety seat restraint adapter means of FIGS. 1 through 3.

DETAILED DESCRIPTION OF THE PREFERRED EXEMPLARY EMBODIMENT

Referring initially to FIG. 1, an exemplary embodiment of the present invention in child safety seat restraint adapter means will be described in association with an exemplary passive safety belt installation in an exemplary vehicle indicated generally at 10. Vehicle 10 may be provided with knee pad restraints 11 and 12, for the driver and passenger, respectively, in known manner for restraining the lower portions of the driver's and passenger's body in the event of a sudden deceleration of the vehicle. When such knee restraints are provided in the vehicle, it is possible to employ only a diagonal torso restraint, without a lap belt, for restraining the passenger's upper body portions to the vehicle seats during an emergency deceleration of the vehicle.

The exemplary passive diagonal torso safety belt installation in the exemplary embodiment comprises a first belt 13 for the vehicle driver and a second belt 14 for the vehicle passenger. Belts 13 and 14 are adapted by known means, as by belt end tongue plate and buckle means, indicated generally at 15 and 16 to be releasably anchored at their inner ends to floor mounted anchors 17 and 18 inboard of the two "bucket" type vehicle seats 19 and 20 respectively. Opposite ends of the passive safety belt 13 and 14, respectively, pass through belt guides 21 and 22, anchored to the vehicle door and supported in known manner by the center post of the vehicle when the door is closed, to emergency locking safety belt retractors mounted in the vehicle door, also in known manner, and as is indicated in phantom line at 24 in FIG. 1. Such door mounted retractors may be of the vehicle inertia sensitive type as described more fully in the copending application Ser. No. 872,306 filed Jan. 25, 1978 assigned to the assignee of the within application.

In normal operation of the passive safety belt restraint system thus far described in the exemplary vehicle, indicated generally at 10, the driver or passenger on entering the vehicle need merely open the vehicle door, the belt webbing being extended from the associated retractor as the door is opened with the inner end of the belt being held to the associated floor anchor, enter the vehicle and sit upon the vehicle seat beneath the upwardly and diagonally oriented belt, due to the high location of guides 21 and 22 on the vehicle door, and when seated, merely close the vehicle door with the associated retractor winding up excess belt webbing. To leave the vehicle, the passenger need merely open the door, the belt being moved away from the driver or passenger as the door is opened to the position illustrated in FIG. 1. However, if a child safety seat is to be used in association with a vehicle seat, as seat 20, where such preinstalled passive diagonal torso belt is utilized, the child seat can not be restrained to the vehicle seat without the addition of the adapter means of the present invention which will now be described.

As is particularly contemplated within the present invention, child safety seat restraint adapter means are provided to cooperate with the aforedescribed preinstalled passive safety belt to hold a child safety seat on the passenger seat 20 in a manner as illustrated in FIG. 3. Referring to FIG. 3, an exemplary child safety seat 25 is shown which may be constructed in the manner of known child safety seats, as for example that illustrated in U.S. Pat. No. 4,040,664. In said patent, the exemplary child safety seat is held to the passenger seat by passing the normal lap belt across the child safety seat to hold it in place, the child being restrained in the child seat by the seat harness described in that patent. The child seat safety harness illustrated in U.S. Pat. No. 4,040,664 may be employed with the child safety seat 25 illustrated here and the disclosure of that patent pertaining to the child safety seat and harness is incorporated herein by this reference.

Referring to FIGS. 1 and 3, the child safety seat restraint adapter means of the present invention includes an auxiliary safety belt buckle 30 and means for anchoring the buckle 30 outboard of the vehicle 20. Such means for anchoring may comprise the provision of webbing 31 and floor anchor 32 for anchoring buckle 30 to the floor in known manner. While any currently available commercial safety belt buckle construction may be employed for buckle 30, the push button type of buckle is being illustrated and is presently preferred in the majority of current commercial safety belt installations.

Auxiliary tongue plate means, indicated generally at 40, are provided in association with connector means, indicated generally at 50, for releasably engaging a midportion of safety belt 14 to the buckle 30 with inboard webbing portions 14a of belt 14 being thereby connectable about the child safety seat 25 as seen in FIG. 3. As seen in FIGS. 1 and 2, the exemplary auxiliary tongue plate means comprises a tongue plate 41 having a buckle latch receiving aperture 42 on a forward tongue end 43. A belt receiving aperture 44 is provided in a rearward portion of the tongue plate 41 to cooperate with the connector means as hereinafter described.

The exemplary connector means of FIGS. 1 through 3, and as best seen in FIG. 2, comprises a connector plate 51 having a pair of rectangular slots 52 and 53, each of said slots being closed about their periphery by adjacent portions of the connector plate. In order to mount the tongue plate 41 to the safety belt 14, and as illustrated in FIG. 2, midportions of the belt may be formed into a loop 14b with the loop being passed through aperture 44 and slot 52 about the center web 54 of plate 51 and back through slot 53 and aperture 44 such that a double lay of webbing 14c, 14d is passed through the aperture and slots to retain the tongue plate in a fixed relation on belt 14 when the tongue plate is connected to buckle 30 with a tension being applied in the webbing portions 14a. As seen in FIG. 3, with the child safety seat 25 positioned on seat 20, webbing portions 14a of belt 14 may be passed about the child safety seat, over the arm portions thereof, and the tongue plate indicated generally at 40, may be inserted into locking engagement with buckle 30 to hold the webbing portions 14a about the seat, while, importantly, allowing the preinstalled passive safety belt 14 to continue in its otherwise operable mode in association with the safety belt retractor, indicated generally at 24, on opening and closing of the door.

When the child seat 25 is removed from the vehicle seat 20, and tongue plate 41 is released from buckle 30, the passive seat belt 14 may be conveniently restored to its normal condition of use by merely unthreading the seat belt webbing portions 14b-c from the connector plate slots 52, 53 and tongue plate aperture 44.

An alternative exemplary embodiment of connecting means is illustrated in FIG. 4 in association with the aforedescribed tongue plate means, indicated generally at 40. As seen in FIG. 4, the alternative embodiment of connector means, indicated generally at 150 comprises a connector plate 151 having a pair of rectangular slots 152 and 153, the slots, however, being open sided through the provision of webbing access openings 160, 161, through the plate 151 to facilitate entraining a single lay of webbing 14b through the slots 152, 153 and aperture 144. In this and the aforedescribed connecting means, there is a "snubbing" action between the connector plate and the tongue plate which prevents relative movement between the tongue plate and safety belt when the belt is under tension, such snubbing action being presently well known in the seat belt art.

Having thus described an exemplary embodiment of child safety seat restraint adapter means for restraining a child safety seat on a vehicle seat in association with a preinstalled passive diagonal torso safety belt, it should be apparent to those skilled in the art that the aforestated objects of the within invention are achieved and that various modifications and adaptations of the present invention in adapter means may be made within the scope and spirit of the invention which is defined by the following claims.

I claim:

1. A child safety restraint adapter means for restraining a child safety seat on a vehicle seat in association with a preinstalled passive diagonal torso safety belt anchored at one end outboard of the vehicle seat on the vehicle door, extending across the vehicle seat and being anchored at an opposite end inboard of the vehicle seat, said adapter means comprising:
   an auxiliary safety belt buckle and means for anchoring said buckle outboard of said vehicle seat;
   an auxiliary tongue plate means for releasable engagement with said auxiliary buckle; and
   connector means for connecting said tongue plate means in a fixed relation to said preinstalled diagonal torso safety belt intermediate its ends whereby said child safety seat may be restrained on said vehicle seat by passing portions of said safety belt inboard of said connector means over said child seat, when positioned on the passenger seat, and engaging said auxiliary tongue plate means with said auxiliary buckle.

2. The child safety seat restraint adapter means of claim 1 wherein said tongue plate means includes a tongue plate having a webbing receiving aperture and said connector means comprises:
   a connector plate having a pair of spaced webbing receiving slots and means for retaining said connector plate on said tongue plate with said slots adjacent said aperture whereby webbing portions of said preinstalled safety belt may be entrained through said aperture and slots to fix said tongue plate to said belt.

3. The child safety seat restraint adapter means of claim 2 wherein:
   said connector plate is provided with webbing access openings through said plate into the slots whereby a single lay of webbing of said belt may be passed through said aperture and slots.

4. The child safety seat restraint adapter means of claim 2 wherein:
   said connector plate slots are peripherally closed whereby a double lay of looped webbing of said belt may be passed through said aperture and slots.

5. The child safety seat restraint adapter means of claim 1 wherein:
   a door mounted safety belt retractor is provided for anchoring said one end on said door whereby portions of said safety belt outboard of said connector means may be retracted and protracted relative said door mounted retractor when said door is closed and opened, respectively, and said tongue plate means is in engagement with said buckle.

* * * * *